(12) United States Patent
Liu

(10) Patent No.: US 6,516,780 B2
(45) Date of Patent: Feb. 11, 2003

(54) SYSTEM AND METHOD FOR OPTIMIZING ENGINE PERFORMANCE

(75) Inventor: Ching-Po Liu, Grand Blanc, MI (US)

(73) Assignee: Siemens VDO Automotive Corporation, Auburn Hills, MI (US)

(*) Notice: Subject to any disclaimer, the term of this patent is extended or adjusted under 35 U.S.C. 154(b) by 0 days.

(21) Appl. No.: 09/845,615

(22) Filed: Apr. 30, 2001

(65) Prior Publication Data

US 2002/0056436 A1 May 16, 2002

Related U.S. Application Data

(60) Provisional application No. 60/248,013, filed on Nov. 13, 2000.

(51) Int. Cl.[7] .................................................. F02P 5/10
(52) U.S. Cl. ........................... 123/406.22; 123/406.14; 123/406.27
(58) Field of Search ..................... 123/406.22, 406.27, 123/339.11, 406.41, 406.24, 406.14

(56) References Cited

U.S. PATENT DOCUMENTS

| | | | | |
|---|---|---|---|---|
| 4,846,130 A | * | 7/1989 | Jensen | ................... 123/406.41 |
| 5,069,183 A | * | 12/1991 | Nagano et al. | ........ 123/406.22 |
| 5,153,834 A | * | 10/1992 | Abo et al. | ............. 123/406.27 |
| 5,276,625 A | * | 1/1994 | Nakaniwa | ............... 123/406.22 |
| 5,648,602 A | | 7/1997 | Hoshina et al. | |
| 5,660,157 A | * | 8/1997 | Minowa et al. | ............. 123/344 |
| 5,740,780 A | * | 4/1998 | Shimizu et al. | ........ 123/406.22 |
| 5,904,129 A | | 5/1999 | Kadota | |
| 5,947,077 A | * | 9/1999 | Yonezawa et al. | .......... 123/295 |
| 6,006,156 A | * | 12/1999 | Tozzi | .................... 123/406.14 |

FOREIGN PATENT DOCUMENTS

| | | |
|---|---|---|
| DE | 19828279 A1 | 12/1999 |
| EP | 0364959 A2 | 4/1990 |
| JP | 3-124967 | 4/2000 |
| JP | 2000110645 | 4/2000 |

* cited by examiner

Primary Examiner—Erick Solis

(57) ABSTRACT

An engine control system and method include determining which engine cylinder is performing at a level differently than a majority of the other cylinders. Whenever a cylinder output is below that of the other cylinders, an engine performance variable, such as the spark angle, preferably is adjusted to bring the cylinder indicated mean effective pressure into conformance with that of the other cylinders. By adjusting the individual cylinder performance variable, engine performance is brought to a desired level of smoothness, especially under conditions such as engine idle.

6 Claims, 1 Drawing Sheet

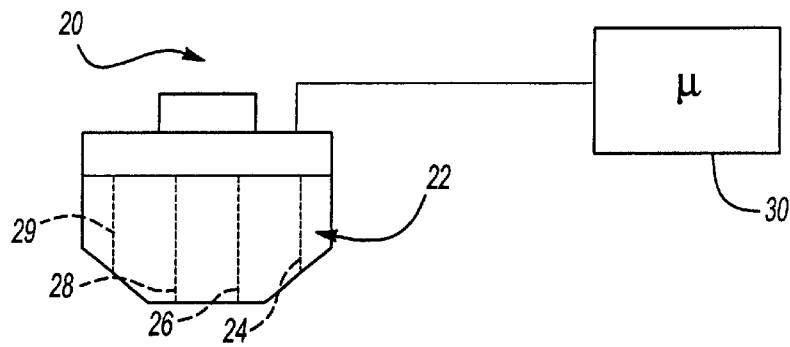
_Fig-1_
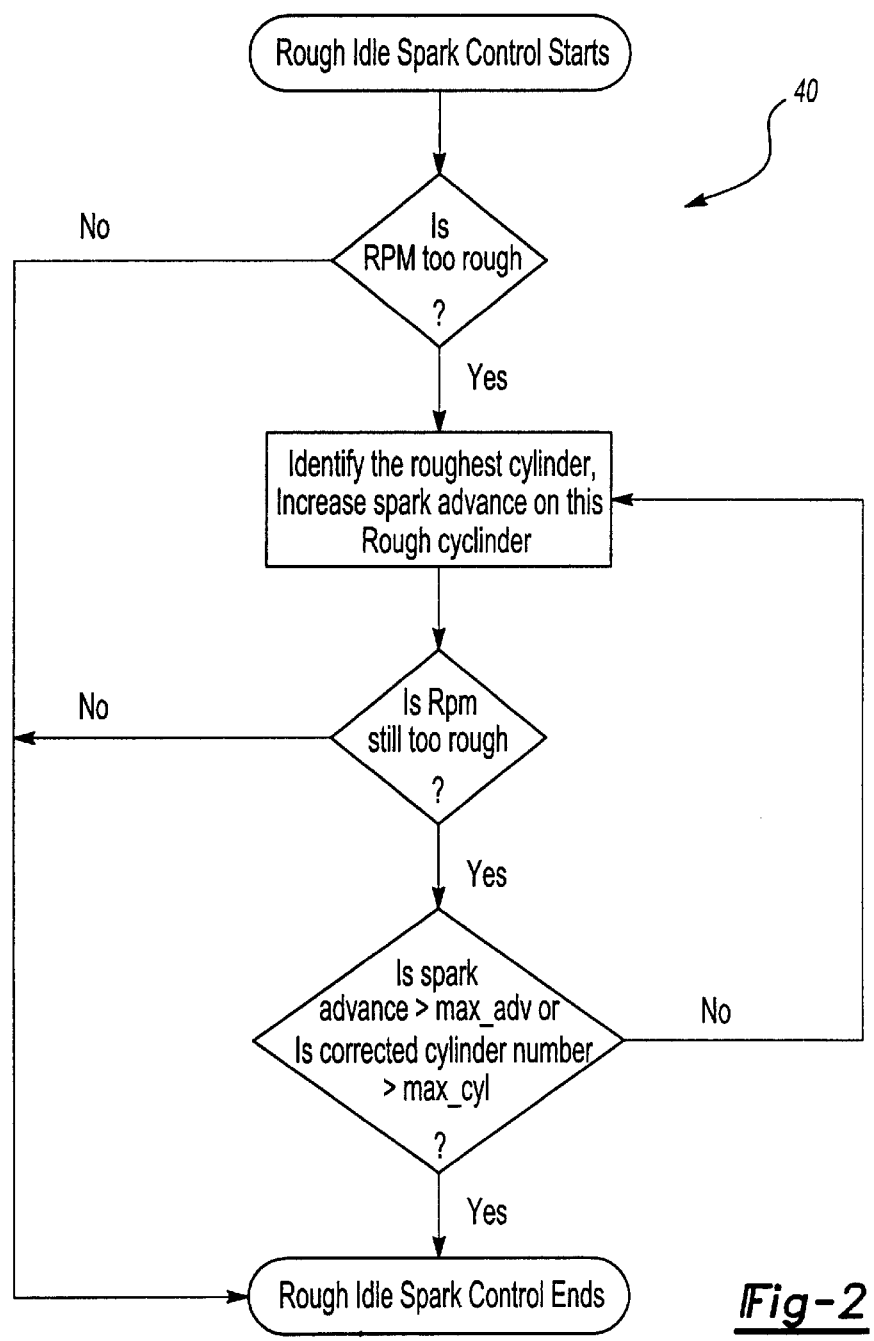
_Fig-2_

SYSTEM AND METHOD FOR OPTIMIZING ENGINE PERFORMANCE

CROSS REFERENCE TO RELATED APPLICATIONS

This application claims priority to U.S. Provisional Application No. 60/248,013, which was filed on Nov. 13, 2000.

BACKGROUND OF THE INVENTION

This invention generally relates to vehicle engine controls. More particularly, this invention relates to a system and method for smoothing out engine performance under certain conditions.

Multiple cylinder vehicle engines are well known. The performance of the engine depends upon certain timing and other performance criteria issues. One problem that is common in vehicles is a roughness in engine performance at certain low levels, such as engine idle.

Engine roughness at engine idle or other low load conditions often results from imperfections in the engine components, which form the cylinders. Physical variations in the cylinders can result in variations in performance, which is especially noticeable at low level RPMs. Because the spark angle of each cylinder typically is set the same for all cylinders, any manufacturing differences results in less than ideal engine performance at low levels. The conventional way of attempting to address this problem has been to attempt to more tightly control manufacturing processes of the cylinders. Limitations on manufacturing tolerances, however, render this solution less than complete.

This invention provides a unique solution to the problem of controlling rough engine performance at low engine output levels.

SUMMARY OF THE INVENTION

In general terms, this invention is a system and method for controlling the performance of a vehicle engine. A performance characteristic of each cylinder is monitored with the engine performing at a low output level. The preferred engine performance characteristic is the indicated mean effective pressure. Whenever a rough engine condition exists, a determination is made about which of the cylinders is performing differently than the others. Whenever one cylinder, for example, has a lower indicated mean effective pressure than the other cylinders, that cylinder performance is adjusted. In one example, the spark angle of the cylinder performing differently is adjusted to bring that cylinder performance to a level that is consistent with the other cylinders.

In some situations, more than one cylinder is adjusted. It is also possible within the scope of this invention to adjust the performance variable upward or downward to bring the performance of the different cylinder into alignment with the majority of other cylinders.

The various features and advantages of this invention will become apparent to those skilled in the art from the following detailed description of the currently preferred embodiment. The drawings that accompany the detailed description can be briefly described as follows.

BRIEF DESCRIPTION OF THE DRAWINGS

FIG. 1 schematically illustrates a system designed according to this invention.

FIG. 2 illustrates, in flow chart form, a method of this invention.

DETAILED DESCRIPTION OF THE PREFERRED EMBODIMENTS

A system 20 for controlling the performance of a vehicle engine 22 is particularly well suited for avoiding or eliminating rough performance of the engine at low engine output levels. While a system designed according to this invention is especially useful for controlling engine performance under conditions such as engine idle, it is not necessarily so limited.

The engine 22 includes a plurality of cylinders, schematically illustrated at 24, 26, 28 and 29. A controller 30 monitors the performance of the engine 22 whenever the engine output level is below a selected threshold. In one example, the controller 30 monitors engine performance whenever the engine is idling. In another example, a selected minimum RPM threshold is chosen and the controller 30 monitors the engine performance whenever the engine output level is below that threshold.

The controller 30 preferably includes software programming that allows the controller to make a determination whenever one or more of the cylinders of the engine has an associated misfire condition. Algorithms for determining misfire conditions in vehicle engine cylinders are known. Those skilled in the art who have the benefit of this description will be able to choose from among the known engine misfire feedback algorithms to make a misfire condition determination.

By monitoring which of the cylinders includes a misfire condition, the system of this invention makes a determination which of the engine cylinders is not performing consistently with a majority of the others. For example, a cylinder that includes a misfire condition typically has an indicated mean effective pressure that is lower than other cylinders. This condition often results from differences in the physical configuration of the lower performing cylinder, which often occur during manufacturing processes.

After the controller 30 determines which of the cylinders is not performing consistent with the others, a determination is made as to how to adjust a performance variable for that cylinder to bring it into consistent performance with the others. In one example, the spark angle associated with the lower cylinder is increased so that the indicated mean pressure of that cylinder is raised and more consistent with the remaining cylinders. In one example, the factory default spark angle is 10 degrees and the controller causes increases in increments of 5 degrees.

Depending on the needs of a particular situation, the performance variable of the different performing cylinder may be increased or decreased to achieve a level of consistency as desired.

The controller 30 preferably is programmed to automatically adjust the performance variable without requiring additional input from a vehicle owner or manufacturer. In other words, the system 20 preferably includes a controller 30 that is programmed to diagnose which of the cylinders is causing the undesirable engine performance and to automatically make an adjustment in the performance variable that will bring the cylinders into a consistent level of performance to achieve the desired smoothness of engine operation.

The flow chart diagram 40 of FIG. 2 summarizes a method of this invention. In this example, whenever the engine RPM is too rough, the controller 30 determines which of the cylinders is performing differently than a majority of the others. If a cylinder output is lower than the others, then the spark angle is adjusted upward to increase the performance output of that cylinder. A determination is made whether the increase which is determined to be necessary exceeds a predetermined maximum increase amount. This process is repeated for as many cylinders as necessary within a chosen limit.

Once the cylinders are all performing consistently or the engine smoothness is as desired, the controller 30 preferably ceases to make adjustments to the cylinder performance variable. In the event that the desired smoothness is not achieved but the maximum amount of adjustment on the maximum number of permissible cylinders is made, the controller 30 preferably is programmed to stop making adjustments and at a later time to rediagnose the situation and make potential further adjustments.

The preceding description is exemplary rather than limiting in nature. Variations and modifications to the discussed examples may become apparent to those skilled in the art that do not necessarily depart from the essence of this invention. The scope of legal protection given to this invention can only be determined by studying the following claims.

The following is claimed:

1. A method of controlling the operation of a multiple cylinder vehicle engine, comprising the steps of:

(A) determining an indicated mean effective pressure of each of the cylinders to monitor each cylinder for a misfire condition; and (B) when a misfire condition exists, and adjusting a spark angle associated with a first one of the cylinder that includes an indicated mean effective pressure that is different from an indicated mean effective pressure at least one other of the cylinders to thereby alter the indicated mean effective pressure of the first cylinder.

2. The method of claim 1, including performing step (A) when the engine is operating at a selected level.

3. The method of claim 2, wherein the selected level is engine idle.

4. The method of claim 2, wherein the selected level includes a rate of RPM that is below a selected threshold.

5. The method of claim 1, wherein step (B) includes adjusting a plurality of spark angles associated with a respective plurality of cylinders.

6. The method of claim 1, including performing step (B) until all cylinders have the same indicated mean effective pressure.

* * * * *